(12) United States Patent
Cornew et al.

(10) Patent No.: US 12,473,107 B2
(45) Date of Patent: Nov. 18, 2025

(54) DOCKING STATION FOR AN AERIAL DRONE

(71) Applicant: Corvus Robotics, Inc., Mountain View, CA (US)

(72) Inventors: Thomas Marc Cornew, Portola Valley, CA (US); Mohammed Hanif Kabir, Mountain View, CA (US); Bryan Salvatore Monti, Mountain View, CA (US)

(73) Assignee: Corvus Robotics, Inc., Mountain View, CA (US)

( * ) Notice: Subject to any disclaimer, the term of this patent is extended or adjusted under 35 U.S.C. 154(b) by 0 days.

(21) Appl. No.: 18/634,156

(22) Filed: Apr. 12, 2024

(65) Prior Publication Data

US 2024/0343426 A1   Oct. 17, 2024

Related U.S. Application Data

(60) Provisional application No. 63/496,027, filed on Apr. 14, 2023.

(51) Int. Cl.
*B64U 70/90* (2023.01)
*B64U 80/25* (2023.01)
*B64U 101/70* (2023.01)

(52) U.S. Cl.
CPC ............. *B64U 70/90* (2023.01); *B64U 80/25* (2023.01); *B64U 2101/70* (2023.01)

(58) Field of Classification Search
CPC ........ B64U 70/90; B64U 70/92; B64U 70/93; B64U 70/95; B64U 70/97; B64U 70/99; B64U 80/25; B64U 2101/70
See application file for complete search history.

(56) References Cited

U.S. PATENT DOCUMENTS

| | | | |
|---|---|---|---|
| 9,242,728 B2 | 1/2016 | Morrison | |
| 9,448,562 B1 * | 9/2016 | Sirang | G05D 1/0676 |
| D805,018 S * | 12/2017 | Sobota Rodriguez | D12/345 |
| 10,577,126 B2 * | 3/2020 | Mozer | B64F 1/02 |
| 10,710,707 B2 * | 7/2020 | Chen | B64C 25/08 |
| 11,168,487 B2 * | 11/2021 | Wankewycz | B64U 80/30 |
| 11,767,110 B2 * | 9/2023 | Falk-Petersen | B64U 80/70 244/63 |
| 11,873,116 B2 * | 1/2024 | Kozlenko | B64D 45/08 |
| 12,195,198 B2 * | 1/2025 | Columbus | B64D 9/00 |

(Continued)

FOREIGN PATENT DOCUMENTS

| | | | | |
|---|---|---|---|---|
| CA | 3228440 A1 * | 2/2023 | | B64U 10/14 |
| EP | 4173947 A1 * | 5/2023 | | B64C 25/62 |

(Continued)

*Primary Examiner* — Benjamin P Lee
(74) *Attorney, Agent, or Firm* — Dority & Manning, P.A.

(57) ABSTRACT

A drone docking station for an aerial drone is provided. The drone docking station includes a platform and a drone positioning device. The platform includes a drone landing area. The drone positioning device is disposed on the platform. The drone positioning device includes a sidewall disposed around the drone landing area and a flange extending from the sidewall. The flange includes a first end coupled to the sidewall and a second end distal thereto. The flange extends from the sidewall at a first angle. Methods for securing the drone docking station to a warehouse rack are also provided.

19 Claims, 14 Drawing Sheets

(56) References Cited

U.S. PATENT DOCUMENTS

| | | | |
|---|---|---|---|
| 2016/0311329 A1* | 10/2016 | Rodriguez | B60L 58/18 |
| 2018/0237161 A1* | 8/2018 | Minnick | B64U 50/37 |
| 2019/0337409 A1 | 11/2019 | Demont et al. | |
| 2019/0344888 A1* | 11/2019 | Ben-David | B64C 25/32 |
| 2021/0094687 A1* | 4/2021 | Brock | B64U 10/60 |
| 2021/0125503 A1* | 4/2021 | Henry | B64D 47/08 |
| 2021/0179290 A1* | 6/2021 | Falk-Petersen | B64U 20/50 |
| 2021/0276735 A1* | 9/2021 | Raptopoulos | G08G 5/0026 |
| 2021/0336797 A1 | 10/2021 | Van Duren et al. | |
| 2021/0347500 A1* | 11/2021 | Hagan | B64U 10/13 |
| 2022/0340300 A1* | 10/2022 | X | B64F 1/222 |
| 2023/0312145 A1* | 10/2023 | Scott | B64U 70/92 244/137.1 |
| 2023/0373668 A1* | 11/2023 | Kozlenko | B64U 70/90 |
| 2024/0278946 A1* | 8/2024 | Roberts | B64U 10/16 |
| 2024/0336378 A1* | 10/2024 | Neate | B64U 70/50 |

FOREIGN PATENT DOCUMENTS

| | | | | |
|---|---|---|---|---|
| WO | WO-2021076776 A1 * | 4/2021 | | B64F 1/005 |
| WO | WO 2021/160484 | 8/2021 | | |
| WO | WO-2023146821 A1 * | 8/2023 | | B64U 70/90 |

* cited by examiner

DOCKING STATION FOR AN AERIAL DRONE

FIELD

The present disclosure relates generally to a docking station for an aerial drone. More specifically, the present disclosure is directed to a docking station for an aerial drone including a drone positioning device to facilitate proper placement of the aerial drone on the docking station.

BACKGROUND

Today, the globalized supply chain ships countless goods made around the world to willing buyers. Most manufactured items sold at some point in time move through a warehouse. Many warehouse inventory management systems already make use of handheld label scanners to update and track items. However, there are many challenges in warehouse inventory management due to human error in scanning and updating inventory information. Even with inventory management software, managers and workers frequently don't know where specific items are, whether there are duplicates, whether items get lost or damaged, or what to do about shrinkage (e.g. items taken/replaced without updating the system). In addition, many tools and machines used today pose hazards to human workers who check inventory, such as falls from ladders, injuries from pallet movers or forklifts, and slips from liquid spills or leaks. Errors in inventory information can lead to costly under- or overstock for the warehouse company.

Since many warehouses have predictable layouts and repetitive work, there have been some attempts to use robotic machines to help with warehouse inventory management to automate warehouse tasks. Robotic arms help with carton removal and automated packing. Wheeled ground robots follow painted paths on open warehouse floors with wide aisles to move pallets and cartons. However, ground robots and robotic arms only move in two dimensions, unable to adjust for or see individual cases and packages at different heights, in warehouses with aisles sometimes stacked from floor to ceiling. Even if connected to inventory management systems, such machines are sometimes unable to efficiently provide a complete picture of warehouse inventory to warehouse managers.

SUMMARY

Aspects and advantages of embodiments of the present disclosure will be set forth in part in the following description, or may be learned from the description, or may be learned through practice of the embodiments.

Aspects of the present disclosure are directed to a drone docking station for an aerial drone. The drone docking station includes a platform and a drone positioning device. The platform includes a drone landing area. The drone positioning device is disposed on the platform. The drone positioning device includes a sidewall disposed around the drone landing area and a flange extending from the sidewall. The flange has a first end coupled to the sidewall and a second end distal thereto. The flange extends from the sidewall at a first angle.

Aspects of the present disclosure are also directed to a drone docking station for an aerial drone. The drone docking station includes a housing defining a platform having a drone landing area. A drone positioning device is disposed on the platform. The drone positioning device includes a sidewall disposed around the drone landing area and a flange extending from the sidewall. The flange having a first end coupled to the sidewall and a second end distal thereto. The flange extends from the sidewall at a first angle. The drone docking station includes one or more cooling devices disposed within the housing, the one or more cooling devices configured to reduce a temperature of the aerial drone. The drone docking station includes one or more functional locations disposed on the drone landing area. The one or more functional locations are configured to make direct contact with the aerial drone.

Aspects of the present disclosure are also directed to a method for securing a drone docking station to a warehouse rack. The method includes coupling an attachment mechanism to the drone docking station and coupling the attachment mechanism to the warehouse rack.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
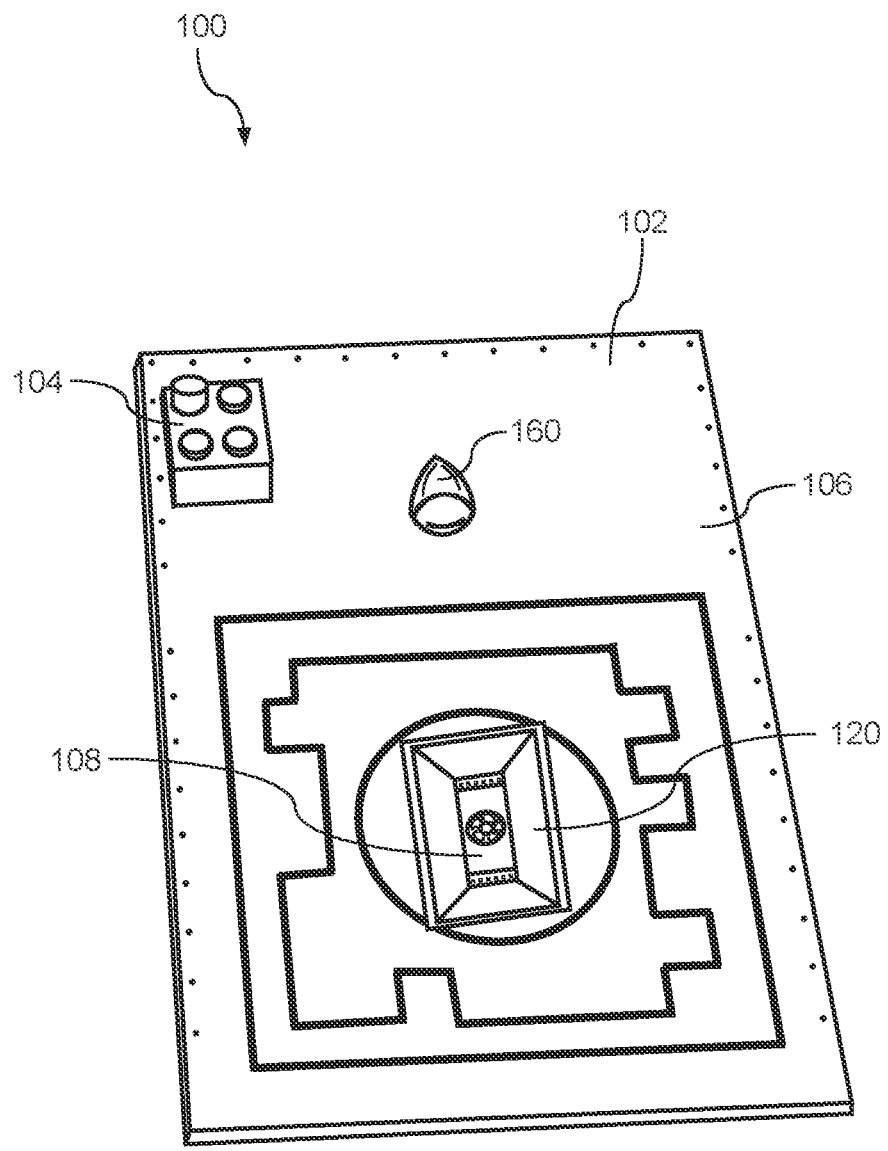
FIG. 1 depicts a top down view of an example drone docking station according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Inventory management systems (e.g., warehouse inventory management systems) can employ acrial drones to scan identifiers of inventory items stored within a storage facility (e.g., warehouse), a manufacturing facility, and/or within a shopping facility, or the like. Acrial drones utilized for inventory management can include an optical sensor (e.g., a laser scanner, photodetector array, camera, any combination thereof, or the like), an indoor positioning system (e.g., a triangulation based indoor positioning system, a light ranging and detection based indoor positioning system, or an indoor positioning system based on camera or LIDAR sensor systems coupled with a processor running simultaneous localization and mapping or visual-inertial odometry algorithms), and a controller. One or more battery packs can also be disposed on the aerial drone to provide power to the components thereon. The aerial drones can be controlled by the controller, which is in communication with a processor that can be configured to direct and schedule flight times and patterns for the drones. In such systems, the drones can be remotely operated and can be scheduled to take inventory in the warehouse according to schedules.

After or before completion of inventory scanning tasks, the acrial drones may use a location (e.g., a drone docking station) to dock in between scanning tasks. Further, batteries powering the acrial drone may need to be recharged and the aerial drone may need a mechanism for communicating gathered data to a remote processor for processing. As such, a drone docking station can be utilized. However, proper docking of the aerial drone to the drone docking station is important to ensure that the drone can be recharged and can communicate all necessary data. For instance, during landing of the acrial drone on a docking station, it is important that the aerial drone is positioned in the correct spot in order to connect appropriately with charging components and processing components on the charging station. For example, failure of an aerial drone to correctly position on the docking station can cause the batteries on the drone to fail to charge, yielding an out of commission drone that is incapable of completing its next scheduled inventory scan. This problem is exacerbated when multiple drones are utilized in concert to scan inventory in a large warehouse. For instance, upon deployment of multiple drones, the drones may not always return to the same docking station. If a drone with a dead battery remains disposed in the docking station, then, after the next inventory schedule, a different drone may be slated to land in the docking station already occupied by a drone with a dead battery. Further, if a drone is unable to fully charge during docking, it could run out of battery mid-scan rendering the drone incapable of completing its scheduled warehouse scan.

Additionally, if the drone is not properly docked, it may be incapable of receiving or transmitting data effectively from the docking station and ultimately from a remote network platform. For instance, during scanning activities the drone generates data regarding inventory in the warehouse. Ineffective contact between the docking station and the drone due to improper placement of the drone, can cause data from the drone to not properly be captured by the docking station and, ultimately, the remote network platform. Further, the drone may not be able to receive data regarding its next scheduled inventory scan location. As discussed hereinabove, if multiple drones are utilized for inventory scanning, improper data transmittal amongst the drone and the docking station can negatively influence the ability of the drones to effectively scan all scheduled areas of the warehouse. Further, large amounts of data may need to be transmitted between the drone and a remote network platform. Given different communication platforms disposed on the docking station, it can take significant amounts of time to transfer data to and from the drone via the docking station. This can delay subsequent inventory scanning by the drones, which could lead to the drones being ineffective for scanning large areas of the warehouse.

Further, after operation of the drone, the battery pack and other components of the drone can exhibit an increased temperature. Such increased temperatures can negatively affect the workability of the drone or the lifetime of drone component parts. If component parts of the drone (e.g., the battery packs) are not effectively cooled, additional maintenance on the drone and replacement parts may be necessary, which can increase the overall operating cost of the drone.

Accordingly, example aspects provided herein include drone docking stations for an aerial drone that include a platform and a drone position device disposed on the platform. In an example, the platform is equipped with a drone landing area. The drone positioning device includes a sidewall disposed around the drone landing area and a flange extending from the sidewall. The flange includes a first end coupled to the sidewall and a second end distal thereto. The flange extends from the sidewall at a first angle.

Further, in some embodiments, provided is a drone docking station for an aerial drone that includes a housing defining a platform having a drone landing area. In an example, the platform is equipped with a drone positioning device. The drone positioning device includes a sidewall disposed around the drone landing area and a flange extending from the sidewall. The flange includes a first end coupled to the sidewall and a second end distal thereto. The flange extends from the sidewall at a first angle. One or more cooling devices are disposed within the housing and are configured to reduce the temperature of the drone. One or more functional locations are disposed within the housing and are configured to make direct contact with the drone, when the drone is in a landed position.

The drone docking station according to example embodiments of the present disclosure can provide numerous benefits and technical effects. For instance, the drone positioning device ensures that the acrial drone is properly placed in the correct location on the drone landing area of the platform. Given proper contact between the docking station and the aerial drone, the drone can be charged and also can transmit and receive data in an efficient manner to or from the drone docking station. Such efficient connection between the drone and the docking station ensures that the drone is fully charged and can be utilized to complete scheduled scanning activities. Further, data transfer between the drone and the docking station ensures that all inventory from the drone is efficiently communicated to the remote network platform such that data processing and cataloging can be initiated. Further, the drone is capable of receiving necessary updates, such as those pertaining to flight patterns, scanning locations, etc. Additionally, a cooling device (e.g., a fan) can be used to cool down component parts of the drone (e.g., battery packs) during docking. Incorporation and use of the cooling device improves drone performance and reduces maintenance requirements on the drone.

Figure 4:
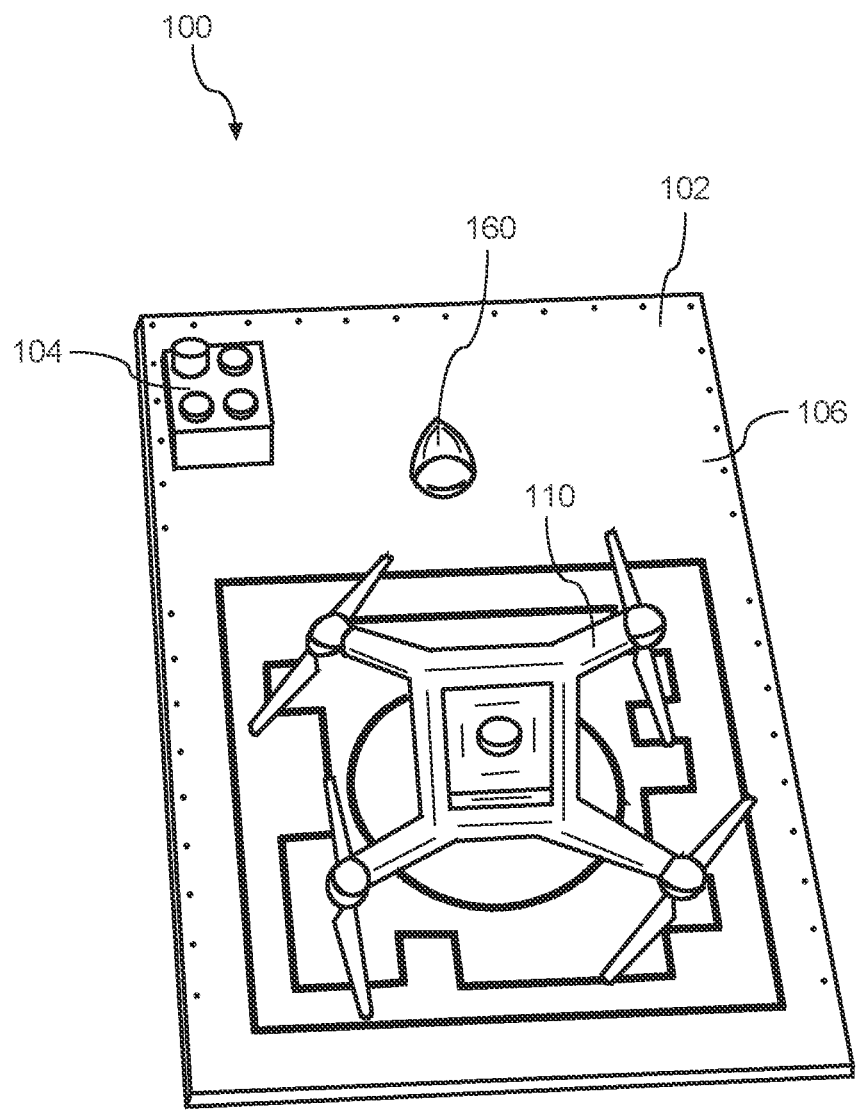
FIG. 4 depicts a top down view of an example drone docking station having an aerial drone docked therein according to example embodiments of the present disclosure.
Figure 5:
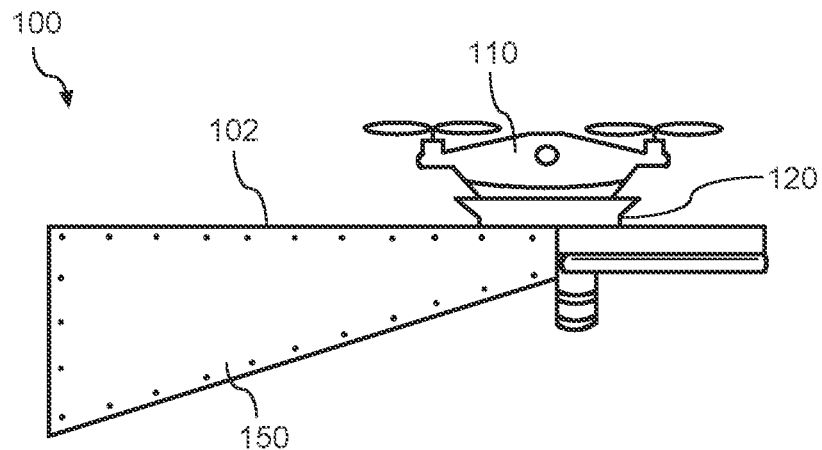
FIG. 5 depicts a cross-sectional view of an example drone docking station having an aerial drone docked therein according to example embodiments of the present disclosure.
Figure 6:
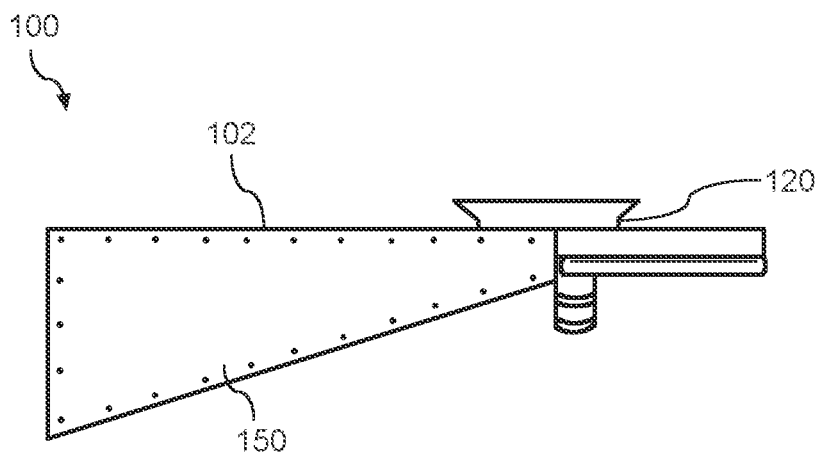
FIG. 6 depicts a cross-sectional view of an example drone docking station not having an aerial drone docked therein according to example embodiments of the present disclosure.

FIGS. 1-6 depict various views of a drone docking station 100 according to example embodiments of the present disclosure. FIGS. 4 and 5 depict a drone docking station 100 according to example embodiments of the present disclosure having an aerial drone 110 (shown in FIG. 4) docked thereto. The drone docking station 100 includes a platform 102 having a drone landing area 108 disposed thereon. For instance, the platform 102 can include an outer surface 106 having the drone landing area 108 defined thereon. Insignia or other identifications can be disposed on the platform 102 that can help an aerial drone 110 correctly identify the platform 102 for docking. The platform 102 can include a bottom portion that is opposite from the outer surface 106. Additional components can be coupled to the bottom portion of the platform 102 as desired. Certain additional components will be discussed further hereinbelow.

A drone positioning device 120 is disposed on the platform 102. The drone positioning device 120 is configured to facilitate proper placement of the aerial drone 110 on the drone landing area 108, as shown in FIG. 4. For instance, the drone positioning device 120 is configured to facilitate proper placement of the aerial drone 110 on the drone landing area 108 such that direct contact between the drone 110 and the drone docking station 100 is achieved. In an example, a power button 104 is also disposed on the drone docking station 100. The power button 104 can be used to immediately cut power to the drone docking station 100 in the event of an emergency. For instance, the power button 104 can be an emergency cut off button that a warehouse worker can press in the event that one or more of the aerial drones 110 presents a safety problem. Given that the warehouse employees may not fly or operate the aerial drones 110, the power button 104 provides for a mechanism for warehouse employees to shut down the aerial drone 110 in the event of a safety emergency. The drone docking station 100 can also include a housing 150 (shown in FIG. 2). The housing 150 can define one or more walls (e.g., sidewalls, bottom wall, etc.) defining an enclosure. Additional components (e.g., computers) can be disposed within the housing 150 of the drone docking station 100 as will be discussed further hereinbelow.

Figure 2:
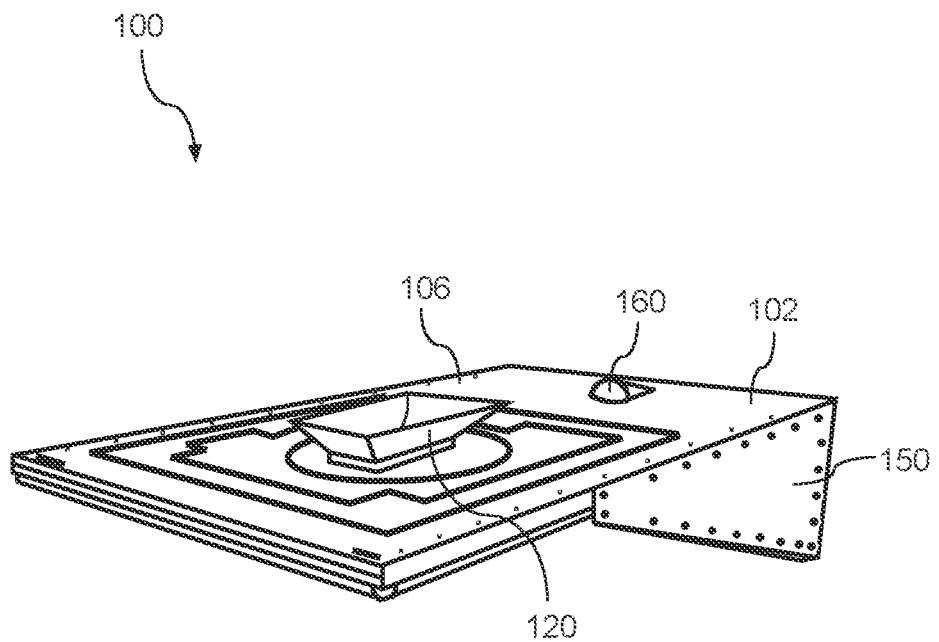
FIG. 2 depicts a side perspective view of an example drone docking station according to example embodiments of the present disclosure.
Figure 3:
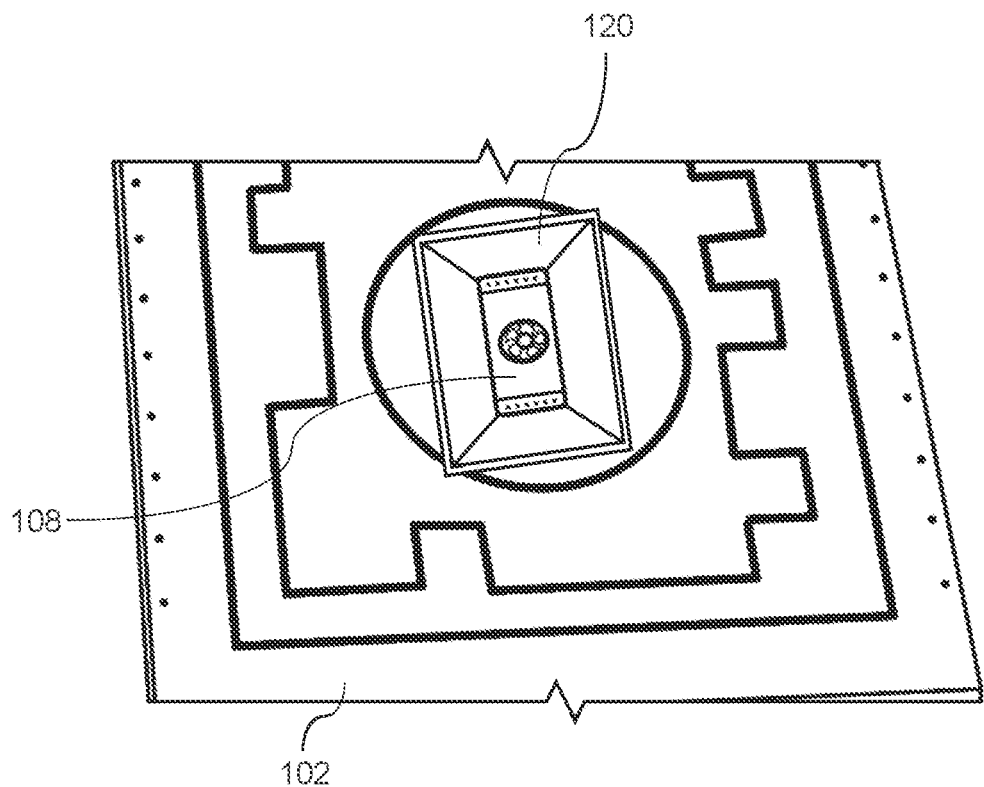
FIG. 3 depicts a partial top down view of an example drone docking station according to example embodiments of the present disclosure.

As shown in FIGS. 1-2 and 4, the platform 102 can include a camera 160 disposed thereon. The camera 160 can be positioned such that it can observe landing and takeoff patterns of the aerial drone 110. In the event of a malfunction of aerial drone 110, the camera 160 can be utilized to inspect the aerial drone 110 for flight issues or other maintenance issues. For instance, the camera 160 can be used to assess proper alignment or function of the rotors of the aerial drone 110. The camera 160 can also be utilized to assess components of aerial drone 110 for further maintenance. The camera 160 can be communicatively coupled to a computer or processor that is remote to the drone docking station 100 or disposed within the drone docking station 100. For instance, the camera 160 can be communicatively coupled to the drone docking station 100 via a wireless and/or a wired network connection. The camera 160 can transmit data, such as images and video footage, to a remote computer such that further processing or viewing of the images by a user is permitted.

Figure 7:
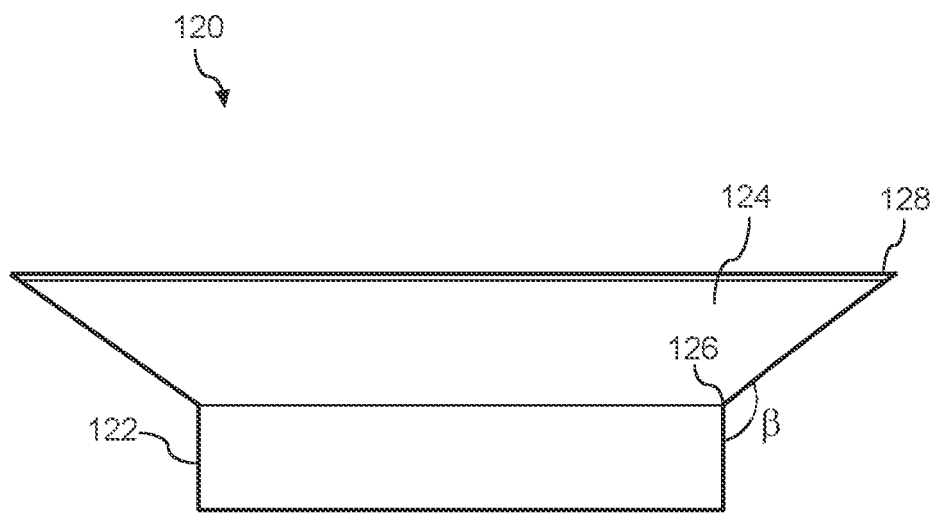
FIG. 7 depicts a cross-sectional view of an example drone positioning device according to example embodiments of the present disclosure.
Figure 8:
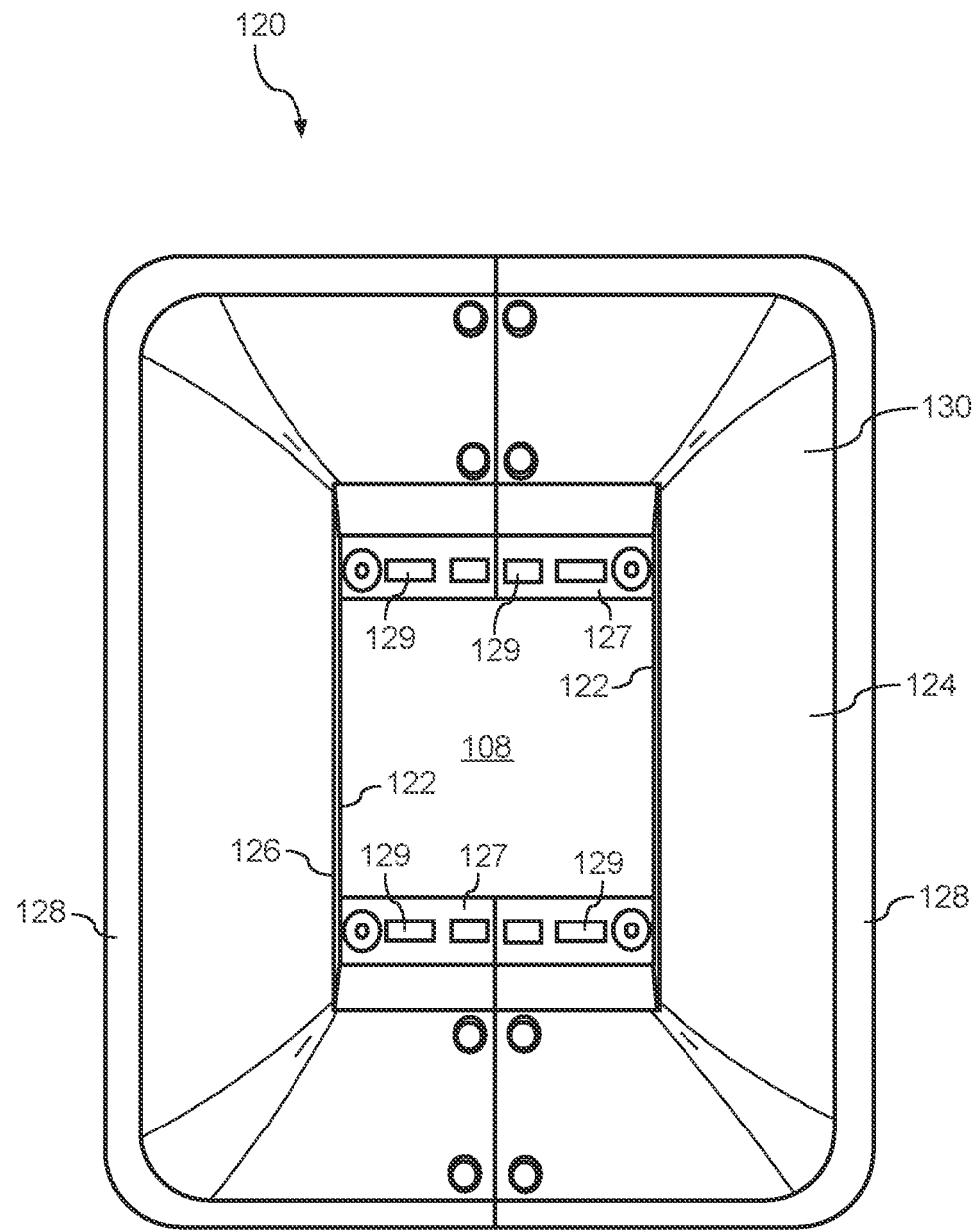
FIG. 8 depicts a top down view of an example drone positioning device according to example embodiments of the present disclosure.
Figure 9:
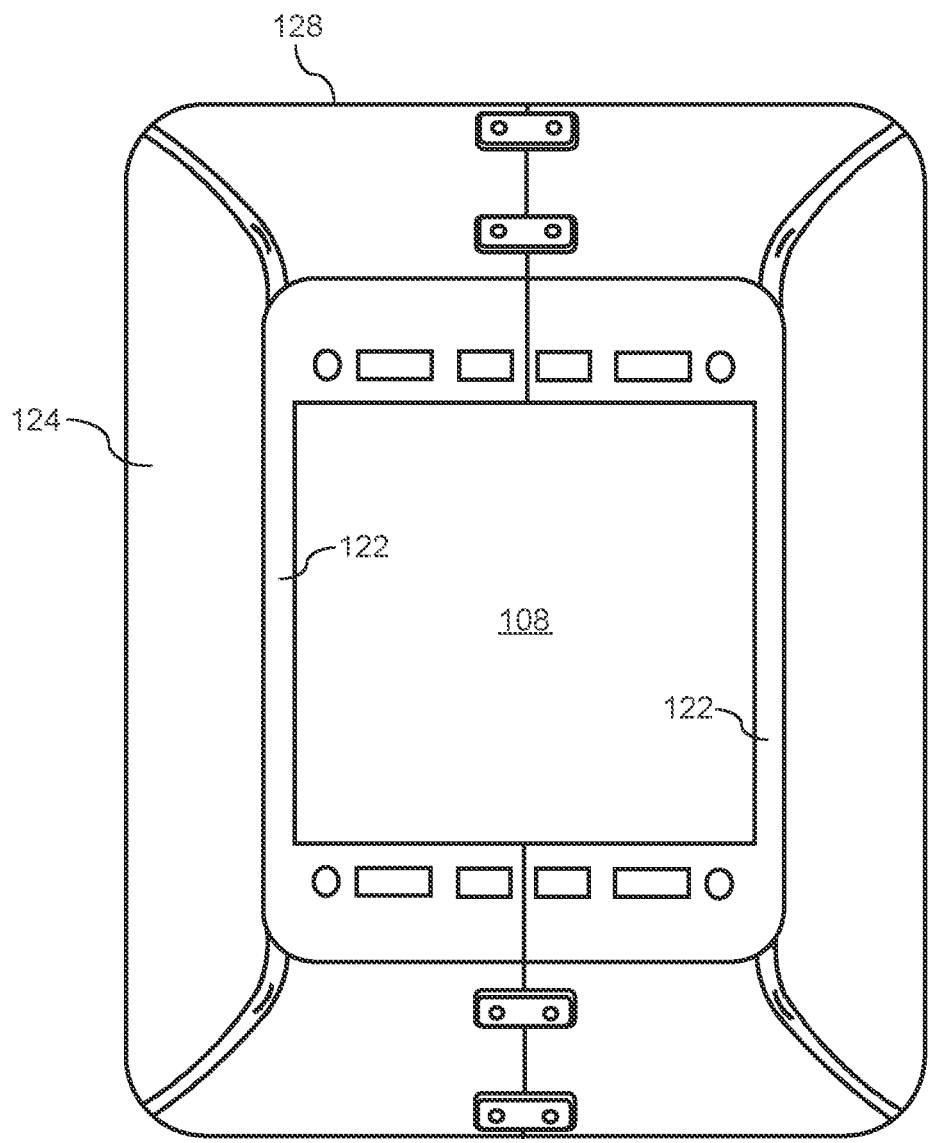
FIG. 9 depicts a bottom up view of an example drone positioning device according to example embodiments of the present disclosure.

Referring now to FIGS. 7-9, in an example, the drone positioning device 120 includes a sidewall 122 disposed around the drone landing area 108. Sidewall 122 has an inner surface that may come into contact with portions of the aerial drone 110 during landing and docking of the acrial drone 110. Notably, the sidewall 122 can be disposed around the perimeter of the drone landing area 108 and can be sized such that the aerial drone 110 is capable of docking on the drone landing area 108 in a certain location. Thus, placement of the sidewall 122 ensures that the aerial drone 110 is properly positioned on the drone landing area 108. The drone positioning device 120 further includes a flange 124 extending out from the sidewall 122. The flange 124 includes a first end 126 and a second end 128. The first end 126 of the flange 124 is coupled to an upper portion of the sidewall 122. The flange 124 extends out from the sidewall 122 at a first angle β. The first angle β can range anywhere from generally less than about 180° to about 10°, for example from about 170° to about 20°, for example from about 160° to about 30°, for example from about 150° to about 40°, for example from about 140° to about 50°, for example from about 130° to about 60°, for example from about 120° to about 70°, for example from about 130° to about 80°, for example from about 120° to about 90°, for example from about 110° to about 100°. In some embodiments, the first angle β is from about 160° to about 90°.

As shown, the flange 124 generally flares out from the sidewall 122, which can facilitate placement of the aerial drone 110 on the drone landing area 108 of the platform 102. For instance, as an aerial drone 110 is flying back to the drone docking station 100, the aerial drone 110 may be wobbly due to unbalanced propellors or other forces causing it to fly in an erratic manner upon landing. Due to the flange 124, it can facilitate maneuvering of the acrial drone 110 into the proper position on the drone landing area 108. For instance, should the acrial drone 110 bump into the flange 124 during descent, the flange 124 can guide the acrial drone 110 into the space created by the sidewall 122 around the drone landing area 108, thus ensuring proper position of the aerial drone 110 on the drone docking station 100.

The drone positioning device 120, including the sidewall 122 and flange 124, can be formed from any suitable materials. For instance, plastic materials, metal materials, composite materials, or other rigid materials can be used to form the drone positioning device 120. For instance, in certain embodiments the drone positioning device 120 is formed from a plastic material. As shown, the flange 124 can include an interior surface 130 that may, as described above, come into contact with an aerial drone 110. Accordingly, in embodiments, the interior surface 130 of the flange 124 can be coated with a coating for reducing friction. For instance, the interior surface 130 can be coated with a polymeric coating with anti-friction function, such as a polytetrafluoroethylene polymeric coating. One example of a suitable polytetrafluoroethylene polymeric coating is Teflon® available from the Chemours Company in Wilmington, DE. Coating the interior surface 130 of the flange 124 with such an anti-friction coating provides a more lubricious quality to the interior surface 130, thus facilitating placement of the aerial drone 110 without causing damages to exterior surfaces on the aerial drone 110.

A bottom surface 127 of the drone positioning device 120 can be disposed on the platform 102 and can be utilized to couple the drone positioning device 120 to the platform 102. One or more apertures 129 are disposed on the bottom surface 127 of the drone positioning device 120. Once coupled to the platform 102, these apertures 129 can be in alignment with one or more functional locations 140 (not shown in FIGS. 7-9) as will be further discussed herein below. The apertures 129 allow for the functional locations 140 to come in to contact with the aerial drone 110 when the acrial drone 110 is docked within the drone positioning device 120.

Figure 10:
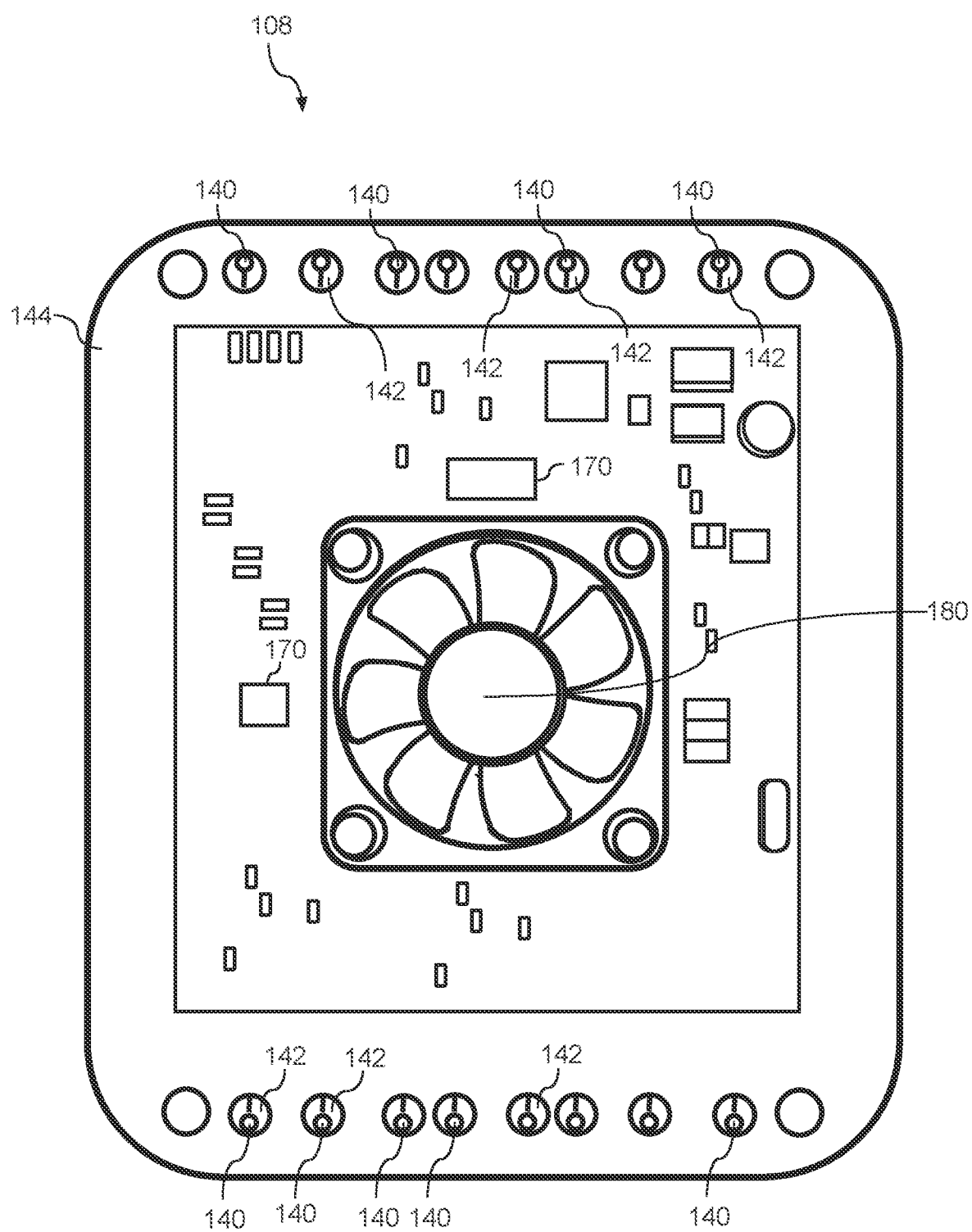
FIG. 10 depicts a top down view of an example drone landing area according to example embodiments of the present disclosure.

Referring now to FIG. 10, the drone landing area 108 is depicted. In embodiments, a printed circuit board 144 is disposed on or within the drone landing area 108. The printed circuit board 144 can include processors, memory, controllers, sensors, etc. One or more functional locations 140 are disposed on or within the drone landing area 108. In certain embodiments, the functional locations 140 can include a plurality of pins 142 (e.g., metal pins or pins made from other conductive materials) that are configured to make contact (e.g., direct contact) with locations on the acrial drone 110. For instance, the acrial drone 110 can be equipped with pins, sheets, or other functional areas (not shown) that are configured to come into direct contact with the plurality of pins 142 to establish a connection between the pins 142 and the aerial drone 110. The pins 142 can be communicatively coupled to the acrial drone 110 such that data can be transferred to or from the drone docking station 100 and the aerial drone 110. In certain embodiments, the pins 142 and the acrial drone 110 are electrically coupled via a direct connection between the pins 142 and the acrial drone 110.

Notably each of the functional locations 140 can be configured to perform certain activities as required for proper operation or function of the drone docking station 100 and the aerial drone 110. For instance, in an embodiment one or more of the functional locations 140 can be configured to charge one or more battery packs on the aerial drone 110. The drone docking station 100 can be coupled to an external power source. The drone docking station 100 can be configured to be connected to any suitable power source (e.g., DC power source and/or AC power source). The drone docking station 100 can utilize the connected power source in order to charge one or more battery packs on the aerial drone 110 at one or more of the functional locations 140. For instance, when direct contact between the aerial drone 110 and the functional location 140 is achieved, the drone docking station 100 can utilize electrical current from an external power source to recharge the battery packs on the aerial drone 110.

In embodiments, the one or more functional locations 140 are configured to communicate data to or from the acrial drone 110. Data collected by the aerial drone 110 during inventory scanning activities can be provided to the drone docking station 100 through the direct contact between the acrial drone 110 and the functional location 140. Data from the acrial drone 110 can be stored on a computer disposed on the drone docking station 100. For instance, components, such as a computer, processor, or other network enabled components can be disposed within the housing 150. Notably, the drone docking station 100 can also be configured to provide data to the aerial drone 110 via contact between the aerial drone 110 and the functional locations 140. Flight schedules, flight locations, instructions, maintenance data, and/or software updates can all be communicated to the acrial drone 110 via the functional locations 140.

The drone docking station 100 can also be equipped with one or more sensors capable of detecting various conditions of the aerial drone 110. The drone docking station 100 can include one or more temperature sensors 170 configured to obtain the temperature of the acrial drone 110 upon landing. During flight, battery packs and other components of the aerial drone 110 can experience an increase in temperature. Upon landing, the aerial drone 110 may be hot, which can interfere with data transfer to or from the aerial drone 110 and can also interfere with the ability of the drone docking station 100 to recharge the battery packs on the aerial drone 110. As such, the temperature sensors 170 can be used to obtain a temperature of the acrial drone 110 upon landing.

The drone docking station 100 can be equipped with a thermal management system. The thermal management sensor can utilize temperature sensors 170 and a controller in order to manage the temperature of the aerial drone 110. For instance, when the temperature of the acrial drone 110 is over a threshold temperature, the drone docking station 100 can utilize one or more cooling devices configured to cool the aerial drone 110. For instance, one such cooling device includes a fan 180. The fan 180 can be disposed on or under the platform 102, such as adjacent to a hole in the platform 102 located in the drone landing area 108. The fan 180 is positioned such that when the acrial drone 110 is in proper landed position on the drone landing area 108, the fan 180 can be operated to operatively cool the battery packs or other component parts of the aerial drone 110. Further, the temperature sensors 170 can be utilized to stop operation of the cooling device (e.g., fan 180), once the temperature of the aerial drone 110 is below a threshold temperature. While a fan 180 is depicted, the disclosure is not so limited and, indeed, any number of cooling devices can be utilized herein. For instance, the cooling devices could include a heat sinks, tubes containing cooling fluid, compressed air, or any other cooling mechanisms that can be configured to remove heat from components of the aerial drone 110.

In other embodiments, the thermal management system can include one ore more heating devices configured to heat the aerial drone 110 or components of the aerial drone 110. For instance, certain warehouses may be operated at cooler temperatures or even freezing temperatures depending on the type of inventory stored therein. For instance, refrigerated warehouses can include temperature ranging from sub-zero up to about 50° F. In such refrigerated environments, it may be necessary to increase the temperature of the aerial drone or component parts of the aerial drone 110. For instance, a heating device can be disposed on or within the drone docking station 100 can ben be utilized to heat the aerial drone 110. In one embodiment, prior to operation of the aerial drone 110, the heating device can be utilized to increase the temperature of the drone in order to increase the temperature of the acrial drone 110 prior to operation of the aerial drone 110. For instance, the heating device can be used to pre-heat the battery or to maintain the drone docking station 100 at a desired temperature. The heating device can include a heater (e.g., and electric heater), or a fan configured to blow hot air to different component parts of the aerial drone 110 or the drone docking station 100. Indeed, the thermal management system can be utilized to manage the temperature of the aerial drone 110 or the drone docking station 100.

In certain embodiments, a desired threshold temperature can be determined and provided to a controller. The controller can include one or more processors and one or more memory devices. The memory device can store and implement computer readable instructions. Accordingly, when the desired threshold temperature is provided to the controller, the controller can operate one or more cooling devices (e.g., fan 180) and/or one or more heating devices to achieve the desired threshold temperature for the aerial drone 110. For instance, the controller can operate the one or more cooling devices to decrease the temperature of the acrial drone 110 to at or below the threshold temperature. In other embodiments, the controller can operate the one or more heating devices to increase the temperature of the aerial drone 100 or the drone docking station to at or above the threshold temperature. The controller can operate in a closed-loop manner to maintain the aerial drone 110 and/or the drone docking station 100 at a desired threshold temperature or within a certain threshold temperature range.

Figure 11:
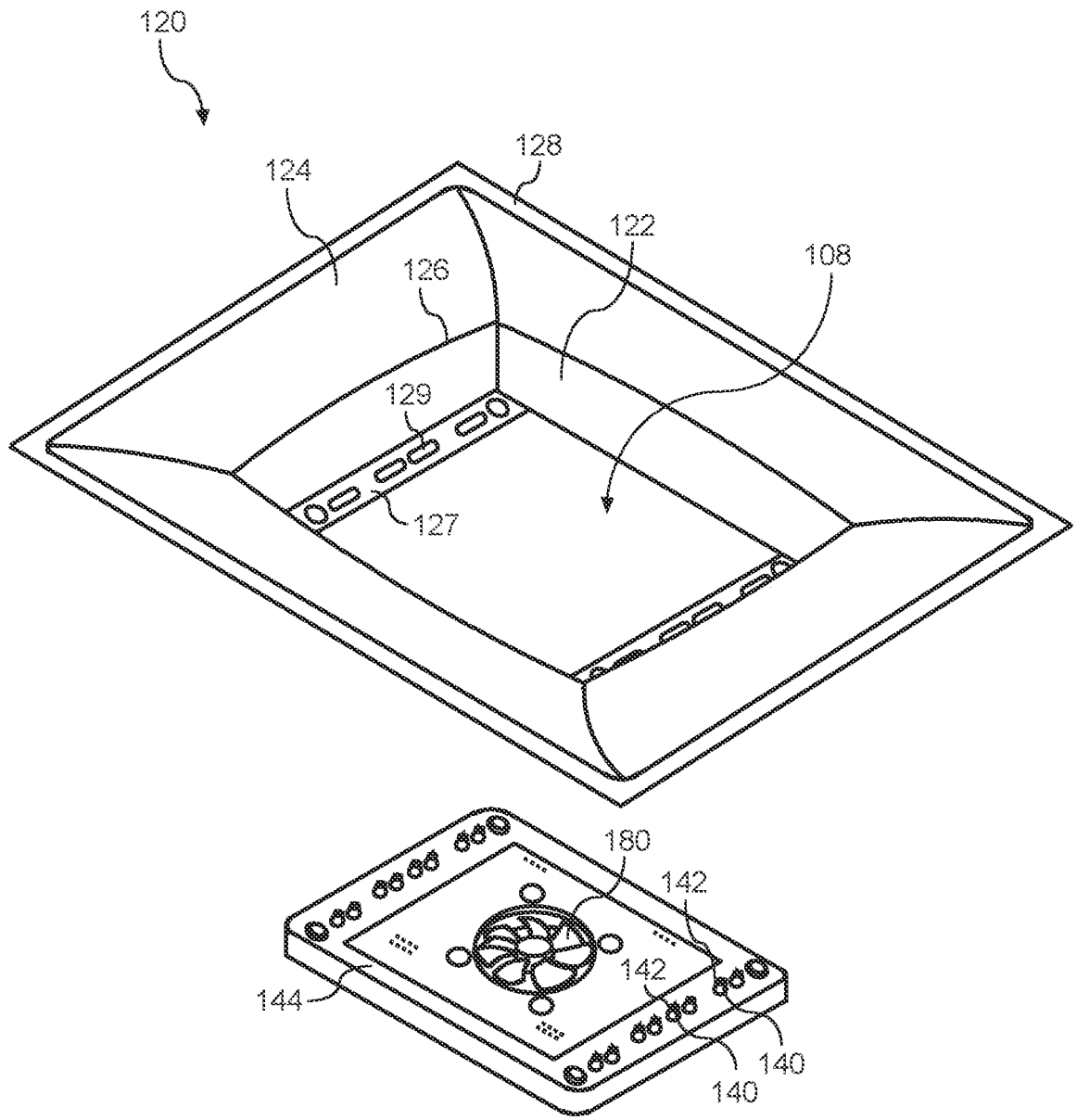
FIG. 11 depicts an exploded view of an example drone positioning device and drone landing area according to example embodiments of the present disclosure.

Now referring to FIG. 11, the drone positioning device 120 can be configured over the printed circuit board 144, such that the apertures 129 align with the functional locations 140 disposed on the printed circuit board 144. Each of the printed circuit board 144 and the drone positioning device 120 can then be coupled to the platform 102 of the drone docking station 100.

Figure 12:
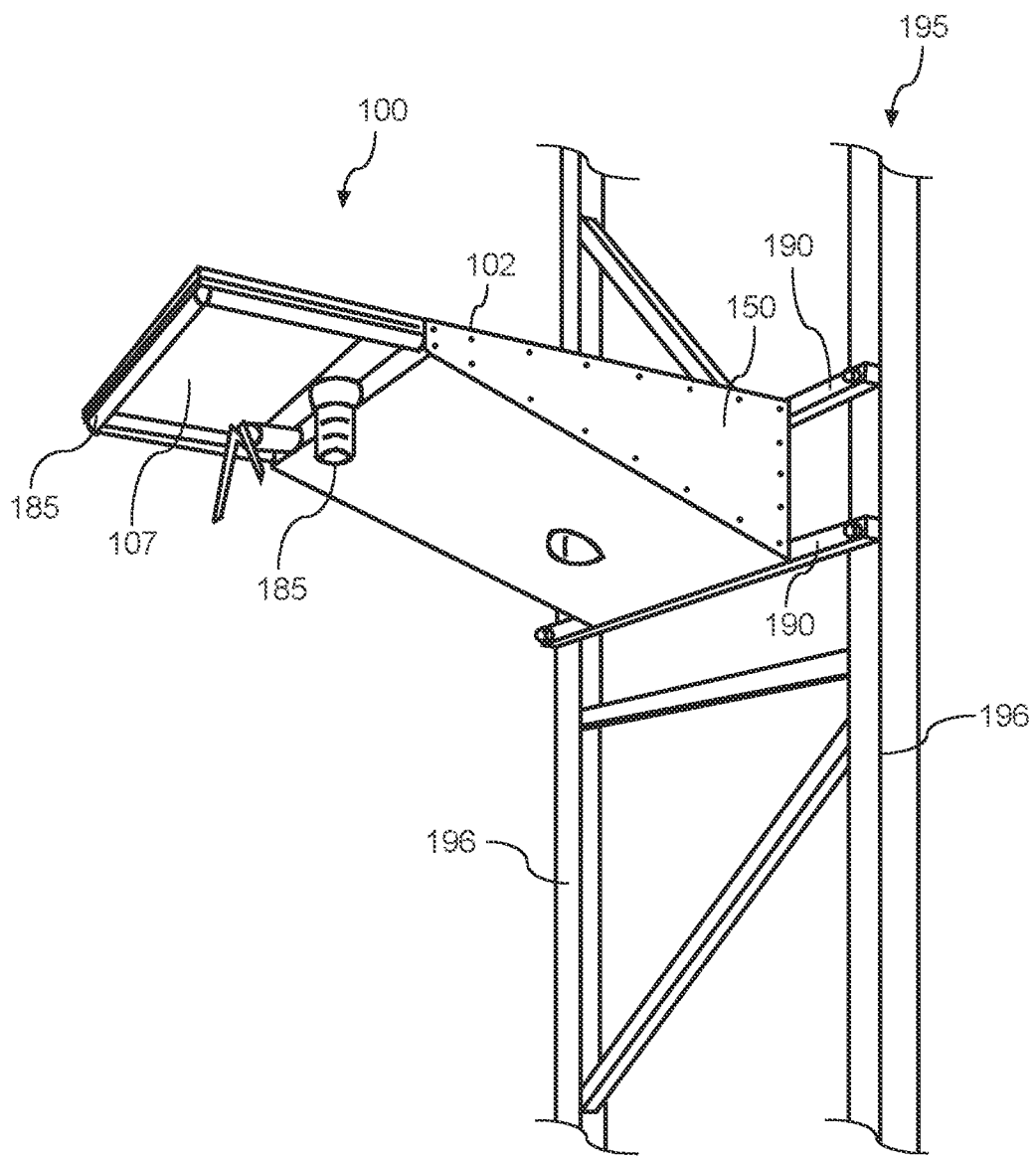
FIG. 12 depicts a perspective view of an example drone docking station coupled to a warehouse rack according to example embodiments of the present disclosure.

Now referring to FIG. 12, alert devices 185 can also be configured on the drone docking station 100. For instance, the alert device 185 can include a visual alert device that is capable of indicating one or more operation functions of the acrial drone. A visual alert device can include a light or light stripe (e.g., LED light strip) capable of indicating to warehouse employees the current or future function of the drone. For instance, the visual alert can include an LED light strip capable of exhibiting different colors of light. Each color exhibited can indicate a function of the aerial drone 110. For instance, a first light color (e.g., red) can indicate that an aerial drone 110 is not docked on the platform 102. A second light color (e.g., blue) can indicate that there is an aerial drone 110 properly docked on the platform 102. A third light color (e.g., purple) can indicate that there is an aerial drone 110 improperly docked on the platform 102. A fourth color (e.g., green) can indicate that there is an aerial drone 110 properly docked on the platform and that the aerial drone 110 is ready to fly. Ready to fly can indicate that the acrial drone 110 has fully charged batteries and that all necessary communications to or from the acrial drone 110 and the drone docking station 100 are complete. Additionally, or alternatively, ready to fly can indicate that the drone has sufficient charge to complete a planned scanning task within the warehouse. Sufficient charge can be determined by the docking station 100 comparing the parameters (e.g., distance, location, charge threshold) of an upcoming drone mission (e.g. as stored in mission data within its memory) to a charge level of the aerial drone 110. In other embodiments, the visual alert can include a flashing light configured to give warning that the aerial drone 110 is about to take flight. For instance, the visual alert including a flashing light, can begin flashing at a predetermined time prior to flight of the aerial drone 110. For instance, the flashing light can flash for one minute prior to aerial drone lift off. As such, the visual indicator provides a one-minute warning to warehouse employees that the drone is about to lift off. In other embodiments, the visual indicator can provide a thirty second warning, fifteen second warning, or ten second warning regarding aerial drone lift off. Notably, the timing of the visual indicator can be adjusted according to individual warehouse preferences.

In other embodiments, the alert device 185 can include an audible alert device. The audible alert device is capable of making a sound to alert warehouse employees regarding potential operations of the drone. For instance, similar to the visual indicator as discussed herein above, the audible alert device (e.g., horn) can sound at predetermined intervals and/or for a specific time prior to an action of the aerial drone 110 (e.g., take-off). For example, a horn can sound at a certain time prior to drone take off. The horn may continue to sound at predetermined intervals as the time for take-off approaches. As the time for take-off becomes closer, the horn may begin to sound in shorter intervals. For instance, the horn may sound every five seconds from one minute to thirty seconds prior to take-off. At thirty seconds prior to lift off the horn may begin to sound every three seconds until about five seconds to take-off. At five seconds to lift off, the horn may sound continuously for the full five seconds. Similar to the visual alerts, such audible alerts can be adjusted according to individual warehouse preferences.

One or more attachment devices 190 can be utilized to secure the drone docking station 100 to one or more racks 195 in a warehouse. For instance, the one or more attachment devices 190 can include one or more hanging bars coupled to the drone docking station 100 and/or the platform 102 of the drone docking station 100. For instance, a hanging bar can be coupled to the platform 102 and then secured to a rack 195 in a warehouse. In embodiments, the attachment device 190 can be coupled to a portion of the housing 150 and secured to a rack 195 in a warehouse. As shown, the rack 195 generally includes two bars 196 spaced apart from each other and generally parallel to each other along a height of the rack 195. The hanging bar coupled to the drone docking station 100 can be secured to each bar 196, such that the drone docking station 100 is secured to the rack 195.

Given forklift operations and foot traffic within the warehouse, the drone docking station 100 may be mounted to the rack 195 at a height that does not interfere with on the ground activities of the warehouse. For instance, the drone docking station 100 can be secured to the rack 195 at a height of at least 12 feet, such as at least 15 feet, such as at least 20 feet, such as at least 25 feet, such as at least 30 feet, such as at least 35 feet, such as at least 40 feet above the floor of the warehouse. Securing the drone docking station 100 at such heights ensures that the docking and operation of the aerial drones 110 does not interfere with normal ground operations (e.g., forklift operation) in the warehouse. Further, given that the drone docking stations 100 can be secured at such heights, in embodiments, it may be advantageous to have the alert device 185 disposed on a bottom portion 107 of the drone docking station 100. For instance, one or more visual indicators (e.g., lights) can be disposed on the bottom portion 107 of the platform 102. Thus, the visual indicators can be observed by warehouse employees from the ground below the drone docking station 100. Placement of visual indicators in such a manner allows for the drone docking station 100 to communicate information regarding the aerial drone 110 to employees below. One or more communication devices 187 can also be disposed on the drone docking station 100. For instance, the communication device 187 can include a wireless component configured to communicatively couple the drone docking station 100 to one or more wireless networks.

Figure 13:
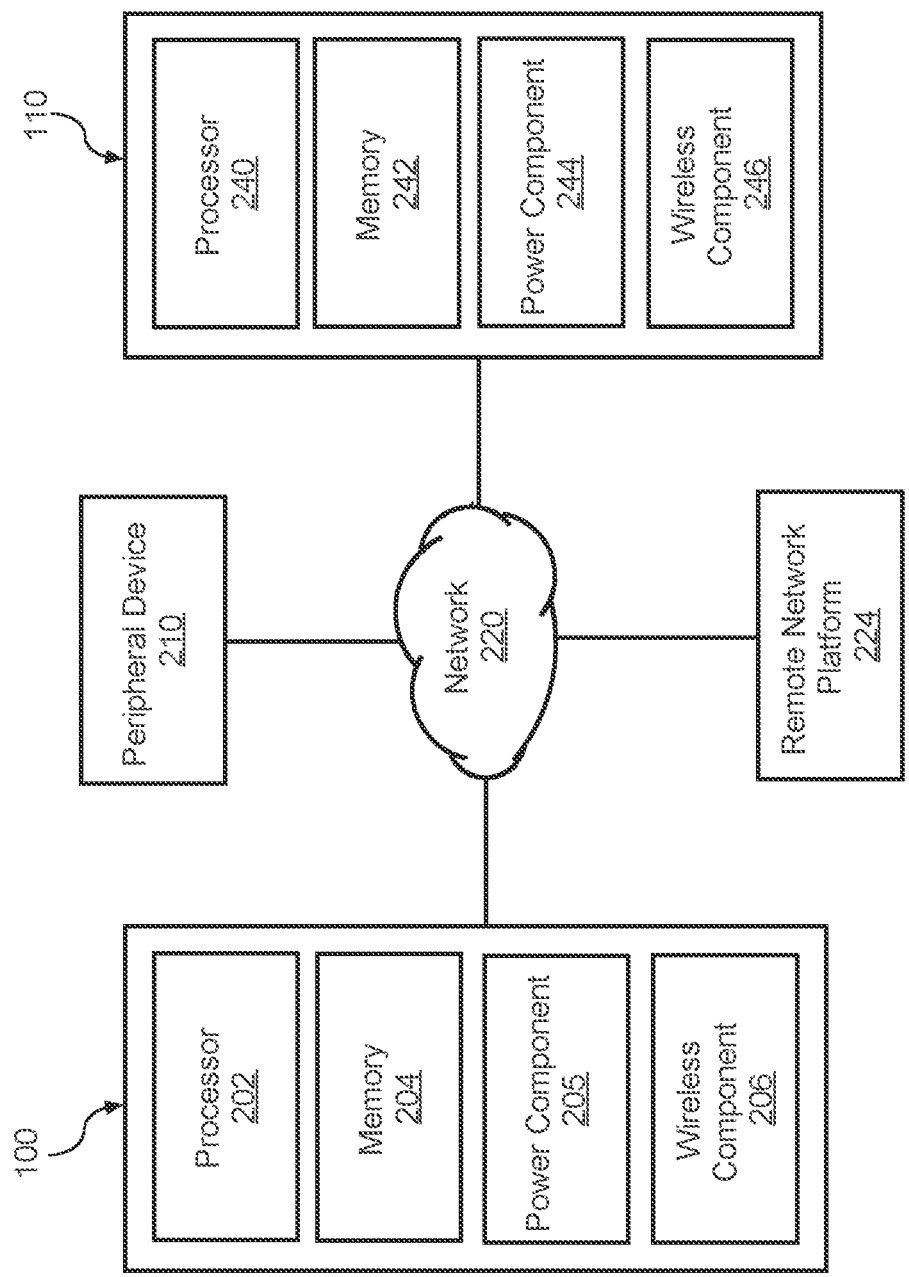
FIG. 13 depicts a set of computing components of a drone docking station and aerial drone according to example embodiments of the present disclosure.

FIG. 13 depicts a set of computing components 200 for a drone docking station 100 and an aerial drone 110. Each of the drone docking station 100 and the aerial drone 110 may respectively include a computing system. The respective computing systems can include the computing components shown in FIG. 13. For example, the drone docking station 100 includes at least one processor 202 for executing instructions that can be stored on the memory 204. As would be apparent to one of ordinary skill in the art, the drone docking station 100 can include many types of memory, data storage or computer-readable media, such as a first data storage for program instructions for execution by the at least one processor 202, the same or separate storage can be used for images or data, a removable memory can be available for sharing information with other devices, and any number of communication approaches can be available for sharing with other devices. The drone docking station 100 can also include one or more power components 205, such as a battery, including a rechargeable battery. The drone docking station 100 typically will include one or more wireless components 206, such as a port, network interface card, or wireless transceiver that enables communication over at least one network 220. The drone docking station 100 can be connected to the network 220 via a wired or wireless connection. The drone docking station 100 can also be connected via the network 220 to one or more peripheral devices 210. Examples of such peripheral devices 210 include personal computers, cell phones, handheld messaging devices, laptop computers, set-top boxes, personal data assistants, electronic book readers and the like. In some embodiments, the drone docking station 100 is connected to the aerial drone 110 via the network 220. The drone docking station 100 can be connected via the network 220 to a remote network platform 224. In embodiments, the wireless components 206 on the drone docking station 100 can be wirelessly connected to the peripheral device 210, the aerial drone 110, and/or the remote network platform 224 via the network 220. Protocols and components for communicating via such a network 220 are well known and will not be discussed herein in detail. Communication over the network 220 can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art. Communication over the network 220 can be enabled via broadband cellular technology. Such broadband cellular technology can include fourth generation broadband cellular technology (4G) or fifth generation broadband cellular technology (5G).

Similar to the drone docking station 100, the aerial drone 110 includes at least one processor 240 for executing instructions that can be stored on the memory 242. As would be apparent to one of ordinary skill in the art, the aerial drone 110 can include many types of memory, data storage or computer-readable media, such as a first data storage for program instructions for execution by the at least one processor 240, the same or separate storage can be used for images or data, a removable memory can be available for sharing information with other devices, and any number of communication approaches can be available for sharing with other devices. The acrial drone 110 can also include one or more power components 244, such as a battery, including a rechargeable battery. The aerial drone 110 typically will include one or more wireless components 246, such as a port, network interface card, or wireless transceiver that enables communication over at least one network 220. While implementations are disclosed with reference to a processor, in some implementations an application specific integrated circuit can be utilized instead of or in addition to a processor. The acrial drone 110 can be connected to the network via a wired or wireless connection. The aerial drone 110 can also be connected via the network 220 to one or more peripheral devices 210. Examples of such peripheral devices 210 include personal computers, cell phones, handheld messaging devices, laptop computers, set-top boxes, personal data assistants, electronic book readers and the like. The aerial drone 110 can be connected via the network 220 to a remote network platform 224. The wireless components 246 on the acrial drone 110 can be wirelessly connected to the peripheral device 210 or the drone docking station 100 via the network 220. Protocols and components for communicating via such a network 220 are well known and will not be discussed herein in detail. Communication over the network 220 can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art. Communication over the network 220 can be enabled via broadband cellular technology. Such broadband cellular technology can include fourth generation broadband cellular technology (4G) or fifth generation broadband cellular technology (5G).

Figure 14:
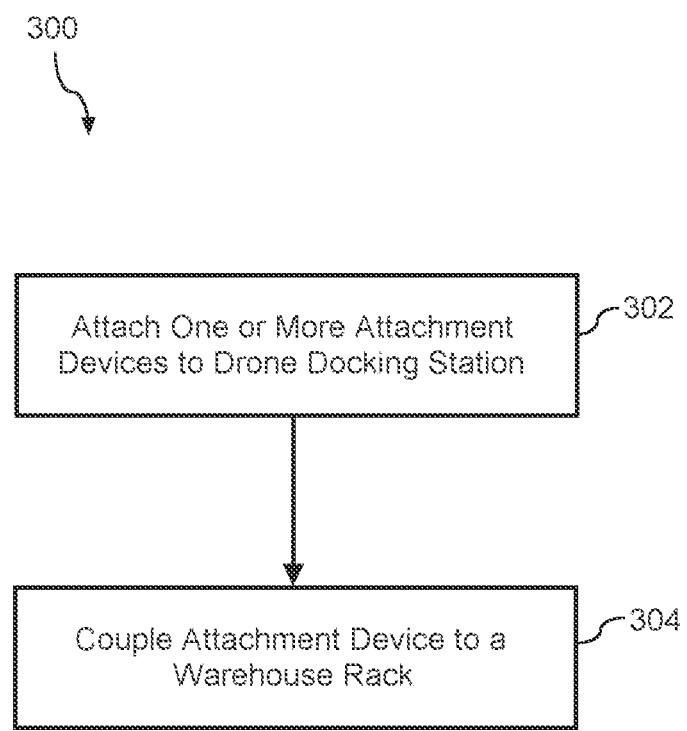
FIG. 14 depicts a flow chart diagram of a method for coupling a drone docking station to a warehouse rack according to example embodiments of the present disclosure.

FIG. 14 depicts a flow diagram of one example method (300) according to example aspects of the present disclosure. FIG. 14 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (302), the method can include attaching one or more attachment devices to the drone docking station. For example, one or more hanging bars can be coupled to the drone docking station. In such embodiments, the hanging bar(s) have a length that is approximately equivalent to the distance between two bars forming a warehouse rack. For instance, warehouse racks typically include at least two end bars extending from the floor towards the ceiling of the warehouse that are configured house one or more shelves therebetween such that inventory can be stacked on the shelves. As such, the end bars are spaced apart from each other in order to accommodate the shelves. Distances between the end bars range from 24 inches to about 60 inches, such as about 36 inches to about 42 inches. Accordingly, the attachment device 190 can include a length ranging from about 24 inches to about 60 inches. In embodiments, the length of the attachment device 190 is about 24 inches. In another embodiment, the length of the attachment device 190 is about 36 inches.

At (304) the method includes coupling the attachment device to a warehouse rack. In embodiments, the attachment device includes one or more hanging bars that can be coupled between the end bars of a warehouse rack. In such embodiments, the attachment device does not extend past an outer edge of the end bars of the warehouse rack. In certain embodiments, in order to couple the attachment device to a warehouse rack, apertures are present on the surface of the end bar of a warehouse rack. The apertures allow for a suitable fastener to couple the drone docking station to the warehouse rack. One or more apertures can be utilized having a diameter ranging from about 12.7 millimeters to about 16 millimeters. For instance, in an embodiment at least two apertures are disposed laterally next to each other on the end bar. The distance from the outer circumference of the first hole to the outer circumference of the second hole ranges from about 40 millimeters to about 50 millimeters, such as about 44 millimeters to about 45 millimeters. The total length of the end bar surface is from about 70 millimeters to about 80 millimeters, such as about 76 millimeters. The center of each of the apertures can be disposed about 22 millimeters to about 24 millimeters from the outer edge of the end bar surface. Suitable fasteners (e.g., screws, pins, nails, bolts, etc.) can then be disposed through each of the apertures in order to couple the drone docking station to the warehouse rack. Notably, utilization of the spacing of the apertures as disclosed in combination with a suitable fastener and attachment device, ensures that the drone docking station is securely coupled to the end bars of the warehouse rack.

Figure 15:
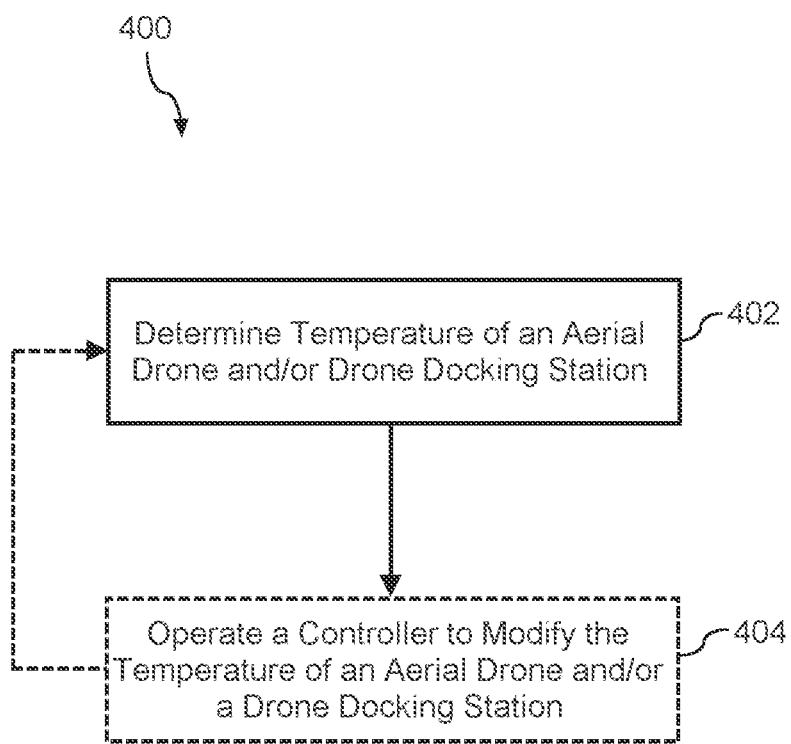
FIG. 15 depicts a flow chart diagram of a method for modifying the temperature of an aerial drone or drone docking station according to example embodiments of the present disclosure.

FIG. 15 depicts a flow diagram of one example method (400) according to example aspects of the present disclosure. FIG. 15 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (402) the method includes determining the temperature of an aerial drone and/or drone docking station. For instance, one or more temperature sensors disposed on the aerial drone or the drone docking station can be utilized to determine the temperature of the aerial drone or the drone coking station. For instance, in certain embodiments, a temperature sensor disposed on the drone docking station can be utilized to determine the temperature of a battery pack of the aerial drone upon landing. In other embodiments, temperature sensors can be utilized to determine the temperature of different portions of the drone docking station.

At (404) the method includes operating a controller to modify the temperature of an aerial drone and/or a drone docking station. For instance, the thermal management system can include one or more heating devices, one or more cooling devices, and one or more controllers. The controller can be configured to operate one or more cooling devices, one or more heating devices, or both to increase or decrease the temperature of the drone until a desired temperature or threshold temperature is achieved. In other instances, the controller can be configured to operate either one or more cooling devices and/or heating devices to maintain the temperature of the aerial drone or the drone docking station at a desired temperature within a temperature range provided.

For instance, upon docking on the drone docking station, the battery pack of the aerial drone could be at an increased temperature as compared to a desired temperature for the battery pack. If the temperature of the battery pack is above the threshold temperature as determined by the sensor, the controller of the thermal management system can operate a cooling device to cool the battery pack of the aerial drone to at or below a desired threshold temperature. Further, while docked to the drone docking station, the thermal management system can utilize temperature sensors and the controller to maintain the battery of the aerial drone or other parts of the drone within desired temperature ranges. For instance, in refrigerated environments, once the temperature of the aerial drone and/or the drone docking station falls below a threshold level, the controller can operate a heating device to heat the acrial drone and/or drone docking station to within the temperature range. Similarly, should the aerial drone or drone docking station exceed a desired temperature range, the controller can operate a cooling device to cool the aerial drone and/or drone docking station back to within a desired temperature range.

Further, (402) and (404) can be repeated or cycled in order to operate the thermal management system in a closed in a closed loop manner. For instance, after the temperature is determined by the temperature sensor and the controller has operated either the cooling device or heating device, the temperature sensors can be utilized again to determine the temperature of the aerial drone or drone docking station and based on that temperature, the controller can then operate either the cooling device or heating device as necessary. Thus, the controller can be operated in a closed loop manner in connection with one or more temperature sensors to maintain the temperature of the aerial drone and/or the drone docking station at a threshold temperature or within a range of desired temperatures.

While the term "warehouse" is utilized throughout the application, the term is not limited only to indoor warehouses as conventionally known. Indeed, the term "warehouse" can include an indoor warehouse, and outdoor warehouse, such as a lumber yard or other outdoor area where inventory is stored, manufacturing facility's inventory storing area, or any area where inventory or objects are stored and may need to be counted and/or categorized.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A drone docking station for an aerial drone, comprising:
a platform having a drone landing area;
an alert device disposed on a portion of the drone docking station and configured to physically indicate, through a plurality of modes, one or more current or future operation functions of the aerial drone; and
a drone positioning device disposed on the platform, comprising:
a sidewall disposed around the drone landing area, and
a flange extending from the sidewall, the flange having a first end coupled to the sidewall and a second end distal thereto, wherein the flange extends from the sidewall at a first angle.

2. The drone docking station of claim 1, wherein the flange comprises an interior surface, the interior surface configured to facilitate placement of the aerial drone on the drone landing area.

3. The drone docking station of claim 2, wherein the interior surface is coated with a polymeric coating for reducing friction on the interior surface.

4. The drone docking station of claim 1, wherein the drone landing area comprises one or more functional locations configured to communicatively couple via direct contact with the aerial drone.

5. The drone docking station of claim 4, wherein the one or more functional locations are configured to charge a battery on the aerial drone.

6. The drone docking station of claim 4, wherein the one or more functional locations are configured to communicate data to or from the aerial drone.

7. The drone docking station of claim 1, comprising a camera disposed on the platform.

8. The drone docking station of claim 1, comprising one or more sensors configured to obtain a temperature of the aerial drone upon landing.

9. The drone docking station of claim 1, comprising a thermal management system configured to cool and/or heat the aerial drone.

10. The drone docking station of claim 1, comprising a hanging bar coupled to the platform, the hanging bar configured to be secured to a rack in a warehouse.

11. A drone docking station for an aerial drone, comprising:
a housing defining a platform having a drone landing area;
an alert device disposed on a portion of the drone docking station and configured to physically indicate, through a plurality of modes, one or more current or future operation functions of the aerial drone;
a drone positioning device disposed on the platform, comprising:
a sidewall disposed around the drone landing area, and
a flange extending from the sidewall, the flange having a first end coupled to the sidewall and a second end distal thereto, wherein the flange extends from the sidewall at a first angle;
one or more cooling devices disposed within the housing, the one or more cooling devices configured to reduce a temperature of the aerial drone; and
one or more functional locations disposed on the drone landing area, the one or more functional locations configured to make direct contact with the aerial drone.

12. The drone docking station of claim 11, wherein the flange comprises an interior surface, the interior surface configured to facilitate placement of the aerial drone on the drone landing area.

13. The drone docking station of claim 12, wherein the interior surface is coated with a polymeric coating for reducing friction on the interior surface.

14. The drone docking station of claim 11, wherein the one or more functional locations are configured to charge a battery on the aerial drone.

15. The drone docking station of claim 11, wherein the one or more functional locations are configured to communicate data to or from the aerial drone.

16. The drone docking station of claim 11, comprising a camera disposed on the platform.

17. The drone docking station of claim 11, comprising one or more sensors configured to obtain the temperature of the aerial drone upon landing.

18. The drone docking station of claim 11, comprising a hanging bar coupled to the platform, the hanging bar configured to be secured to a rack in a warehouse.

19. The drone docking station of claim 11, comprising a hardwired network connection configured to transmit data from the aerial drone via the hardwired network connection.

* * * * *